United States Patent [19]

Ozeki

[11] Patent Number: 5,013,148
[45] Date of Patent: May 7, 1991

[54] PROJECTOR FOR TRANSPARENT FILE SHEET

[75] Inventor: Jiro Ozeki, Tokyo, Japan

[73] Assignee: Slidex Corporation, Tokyo, Japan

[21] Appl. No.: 378,979

[22] Filed: Jul. 12, 1989

[30] Foreign Application Priority Data

Jul. 12, 1988 [JP] Japan .................................. 63-173059
Apr. 18, 1989 [JP] Japan .................................... 1-97762

[51] Int. Cl.$^5$ .......................... G03B 5/00; G03B 21/00
[52] U.S. Cl. ............................. 353/27 R; 353/DIG. 3; 353/95; 353/23
[58] Field of Search ................ 353/27 R, 27 A, 25 R, 353/DIG. 3, DIG. 2, DIG. 5, 95, 120, 23, 24

[56] References Cited

U.S. PATENT DOCUMENTS

| | | | |
|---|---|---|---|
| 2,642,841 | 6/1953 | Funk | 33/448 X |
| 3,344,705 | 10/1967 | Gordon | 353/23 X |
| 3,741,637 | 6/1973 | Katsuragi | 353/27 R |
| 3,807,850 | 4/1974 | Ozeki | 353/23 |
| 4,349,836 | 9/1982 | Sawano | 353/27 R X |

FOREIGN PATENT DOCUMENTS 1445195 8/1976 United Kingdom ............ 353/26 R

Primary Examiner—Harry N. Haroian
Attorney, Agent, or Firm—Fleit, Jacobson, Cohn, Price, Holman & Stern

[57] ABSTRACT

Projector comprising a housing, a support frame formed with a carrying surface for carrying a flexible file sheet in which transparent materials are arranged in the form of a matrix longitudinally and transversely, light source device arranged in the housing at one side of the support frame, projecting lens device arranged at the other side of the support frame, the support frame being mounted on the housing for a reciprocating movement in a first direction, the support frame being provided with guide rails for movably carrying the file sheet in a second direction perpendicular to the first direction. The projector further comprises retaining device for retaining the file sheet onto the carrying surface. The retaining device is mounted on the support frame for slidable or rotatable movement relative to the file sheet so that the transparent material can be easily changed in the file sheet without focus readjustment.

10 Claims, 11 Drawing Sheets

FIG.5A
FIG.5B
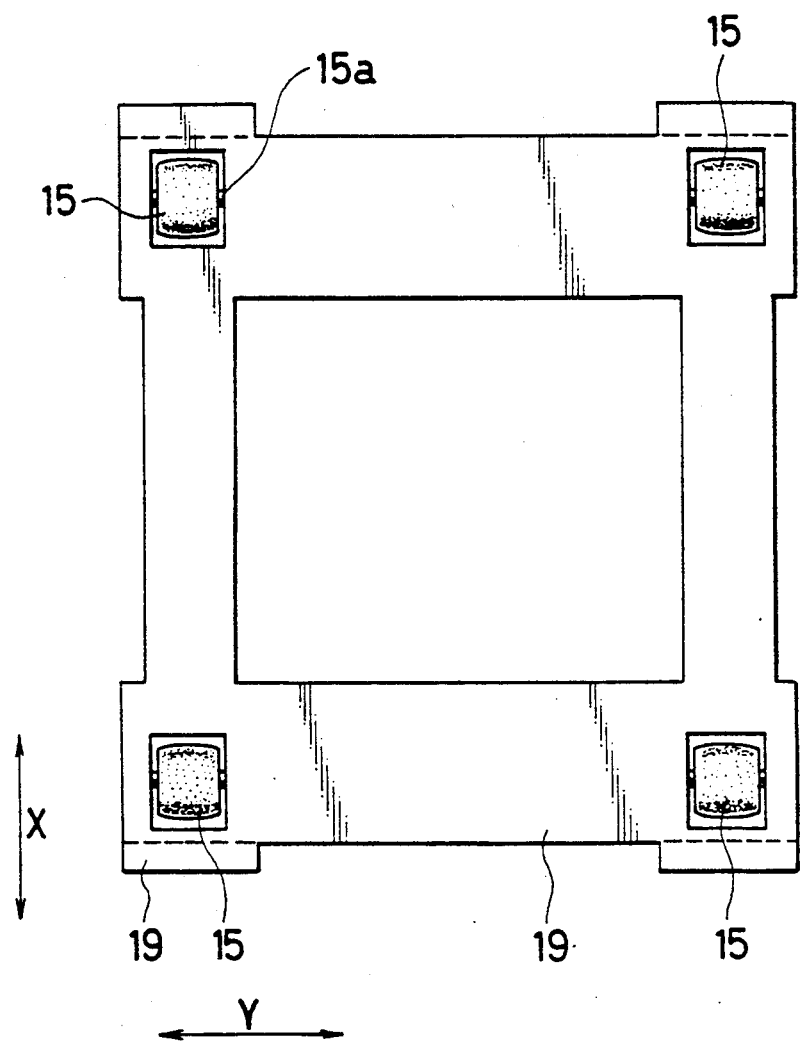
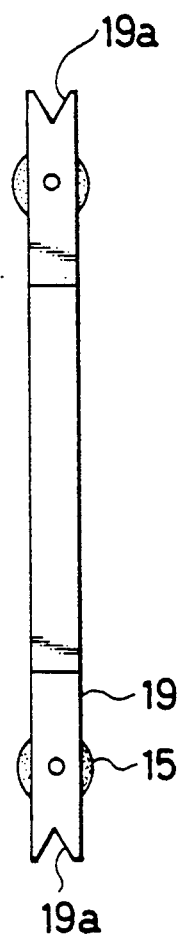

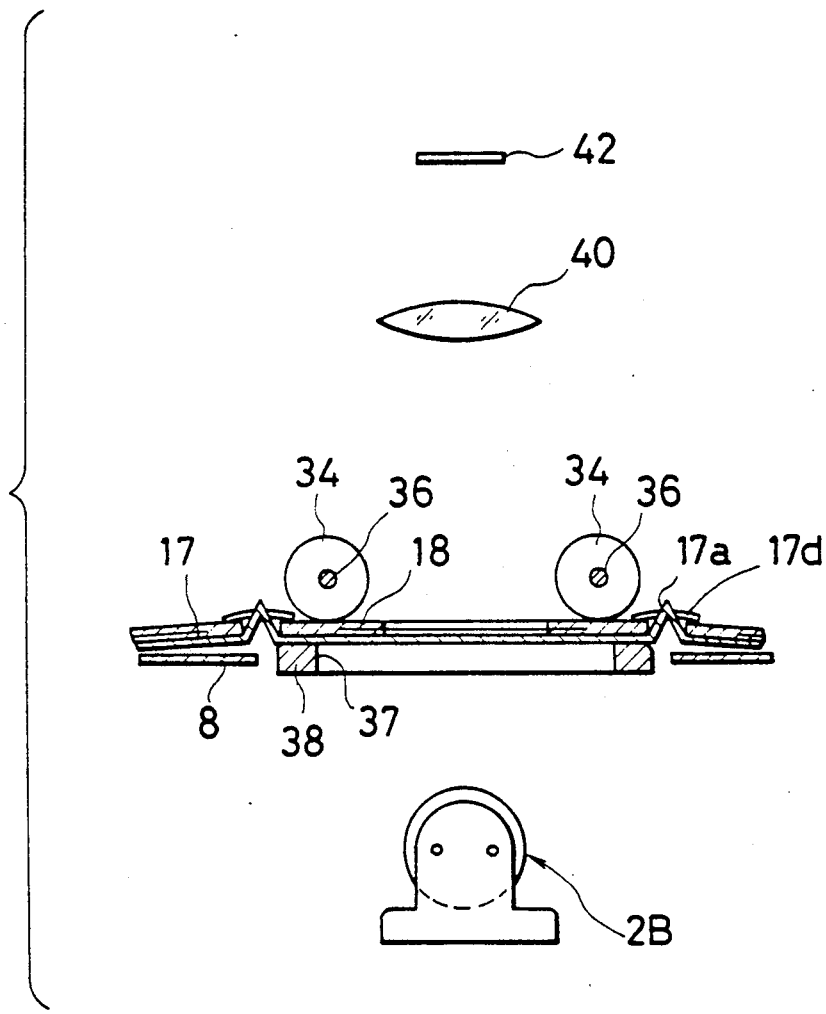

PROJECTOR FOR TRANSPARENT FILE SHEET

BACKGROUND OF THE INVENTION

1. Field of the present invention

This invention relates to a projector for projecting a image or object on a plate-like transparent material such as a photographic slide, a prepared specimen for microscopic observation file sheet onto a screen, specifically to a projector for a file sheet having a plurality of matrix-like arranged such transparent materials to be projected.

1. Description of the prior art

Japanese Patent Publication No. 55-47731 discloses a file sheet for a photographic slide or a prepared specimen in which a plurality of transparent materials are arranged in row and column respectively so that the transparent materials can be projected and observed as they are held on the file sheet. The file sheet can be conveniently bound in an album and the like as it is for facilitating a pigeonholing.

The Japanese Patent Publication illustrates that the transparent material is projected by a projector on a screen as it is carried by the file sheet. Japanese Utility model application 58-10421 laid open to the public in 1983 and Japanese Patent Publication 58-21247 published in 1983 disclose similar projectors thereto. The projector comprises a housing on which a support frame is disposed for carrying a file sheet. The support frame is provided with a carrying surface for carrying the file sheet thereon. The carrying surface is formed with a hole through which an image or information on the transparent material is projected. The file sheet is positioned on the carrying surface of the support frame resulting in positioning the transparent material. Thereafter, the projector is subjected to an focus adjustment with an optical system thereof.

As a matter of fact, it should however be noted that the file sheet is difficult to be kept in a perfect plane condition when positioned. This means that the file sheet partially comes up to produce a partial offset from the carrying surface thereon when it is carried on the carrying surface. The partial offset of the file sheet affects the focusing condition of the optical system. Consequently, even after a focusing work is done with regard to a transparent material on a file sheet, a further focus adjustment may be necessitated for another transparent material on the same file sheet because of possible different distance to the carrying surface from each transparent material in the case where the other transparent material on the file sheet is being prepared for projection. The partial offset is caused by various factors.

For example, the support frame is movably mounted on the housing in only a longitudinal direction wherein the file sheet is slid in a transverse direction to select a transparent material for projection in a relatively simple projector. Where the transparent material for selection is located at one end portion of the file sheet, the other end portion of the file sheet is extended over the support frame to hang down. This causes the partial offset around a transparent material positioned for projection.

There has been known a projector provided with a click stop roller for being engaged with a cut out portion formed on a file sheet in order to position the file sheet with regard to the transverse direction. In this type of projector, the click stop roller urges the file sheet from the opposite side thereof in the longitudinal direction so that the partial offset occurs in intermediate portion of the file sheet.

In order to prevent such partial offset, Japanese Utility Model Publication No. 58-29455 published in 1983 proposes a projector provided with a retaining device for retaining a subject on the carrying surface. The retaining device is provided with a retaining frame movably mounted on an outer cylinder of an optical projecting mechanism of the projector wherein the retaining frame is urged downwardly by means of a spring to retain a file sheet around a transparent material positioned for projection onto a carrying surface of a carrying frame. In this conventional retaining device, it is necessary to lift the retaining frame up against a resilient force of the spring so as to keep the frame away from the carrying surface for allowing the file sheet to be moved longitudinally and/or transversely in each time when a transparent material is replaced for projection. This makes an operation of the projector complicated.

SUMMARY OF THE INVENTION

It is therefore an object of the present invention to provide a projector for a file sheet having plural matrix like arranged transparent materials which can prevent a partial offset of the file sheet to facilitate a focusing work thereof.

It is another object of the present invention to provide a retaining device which is easily handled for retaining a file sheet for a projector.

According to the present invention, the above and the other objects of the invention can be accomplished by in a projector comprising a housing, a support frame formed with a carrying surface for carrying a flexible file sheet in which a plurality of transparent materials are arranged in the form of a matrix longitudinally and transversely and with an opening on the carrying surface for projecting the transparent material, light source means arranged in the housing at one side of the support frame, projecting lens means arranged at the other side of the support frame, the support frame being mounted on the housing for a reciprocating movement in a first direction, the support frame being provided with guide means for movably carrying the file sheet in a second direction perpendicular to the first direction, wherein the improvement comprises retaining means for retaining the file sheet onto the carrying surface, the retaining means being mounted on the support frame for slidable or rotatable movement relative to the file sheet.

Specifically, a projector is provided with a support frame movable in one direction or a longitudinal direction of a housing. A retaining means is provided in the support frame for retaining the file sheet on a carrying surface. In the case where a movable stage which is movable in a transverse direction perpendicular to the one direction may be mounted on the support frame for carrying the file sheet on the carrying surface formed thereon, the retaining means is likewise provided on the support frame to be extended over the movable stage for thereby retaining the file sheet onto the carrying surface. The support frame is provided with guide means for movably carrying the movable stage in a transverse direction perpendicular to the one direction. In a preferred embodiment, the retaining means is constituted by a plate member of U-shaped configuration carried by the guide means like a cantilever and extending onto the carrying surface. In another embodiment, the retaining means is placed across a pair of guide rails arranged at opposite sides of the support frame. IN still another embodiment of the present invention, the retaining means is provided with a pair of resilient rods arranged across a pair of guide rails, rollers mounted on the respective rods for rotation so that the rollers are brought into engagement with an intermediate portion between transparent materials in the file sheet for urging the file sheet against the carrying surface of the support frame.

In further embodiment of the present invention, a pair of rods extending in one direction of the support frame are removably provided with a roller frame on which a plurality of rollers are mounted for being engaged with the file sheet and urging it against the carrying surface.

In yet further embodiment, the light source means is provided at a top portion with a support block having a rectangular opening wherein the support block is arranged in a manner that a top surface of the support block is extended horizontally over the carrying surface of the support frame. A transparent material in align with the light source means among transparent materials in the file sheet is urged by the retaining means against the top surface of the support block.

According to the present invention, the file sheet is intervened between the retaining means and the carrying surface of the support frame or the movable stage. The retaining means urges the file sheet against the carrying surface so that an offset of the file sheet from the carrying surface ore a derivation in focused condition in an optical mechanism can be suppressed even when the file sheet is moved to replace the transparent material thereon for projection.

In the case where the retaining means is constituted by a plate member, the file sheet can be slidably moved relative to the plate member so that the file sheet is moved transversely relative to the support frame for replacing the transparent material for projection as the plate member retains the file sheet onto the carrying surface.

Where the retaining means is provided with roller means, it will be understood that the roller means rotates to facilitate the transverse movement of the file sheet.

The retaining means can be constituted by a removable roller frame having roller means. In this case, where a plurality of the roller frames of different pitches in roller means are prepared, a single projector can be commonly used for a plurality of file sheets having different size, configuration and/or pitch of the transparent material. For instance, a photographic slide is different from a prepared specimen for microscopic observation in dimension so that frame portion of the file sheet is located at a different position from each other. Since the roller means should be moved on the frame portion of the file sheet other than the transparent material, it is impossible to find a roller position satisfactory for both the photographic slide and the prepared specimen. This problem can be solved by preparing one roller frame suitable for the photographic slide and another roller frame for the prepared specimen. The roller frames are selectively mounted on the projector in accordance with the file sheet for projection.

The above and other objects and features of the present invention will become apparent from the following description in connection with the preferred embodiment taking reference with the accompanying drawings.

BRIEF DESCRIPTION OF THE DRAWINGS

FIG. 5A is a plan view of a roller frame employed for further embodiment of the present invention;

FIG. 5B is a side view of the roller frame;

FIG. 8 is a view similar to FIG. 7D but showing still another embodiment of the present invention.

DESCRIPTION OF THE PREFERRED EMBODIMENTS

Figure 1A:
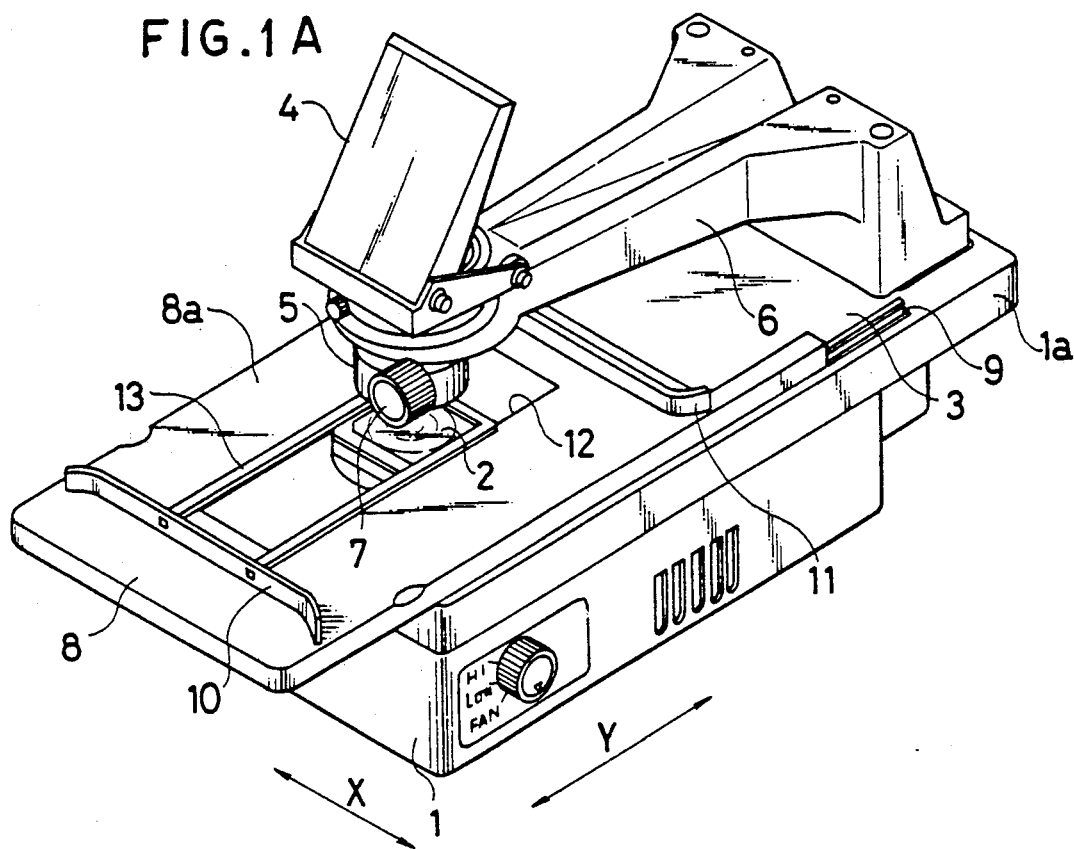
FIG. 1A is a perspective view of a projector in accordance with a preferred embodiment of the present invention.
Figure 1B:
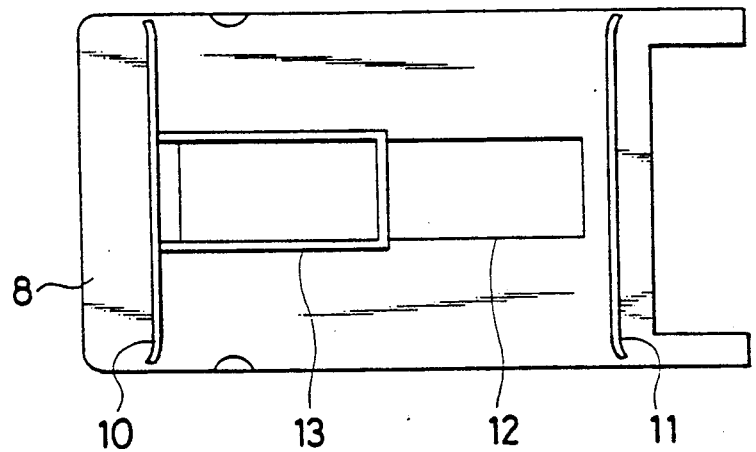
FIG. 1B is a plan view of a support frame employed for the projector of FIG. 1A.

Referring to the drawings, specifically to FIG. 1A through 1D, there is shown a first preferred embodiment of the present invention.

A projector according to this embodiment comprises a main body of the projector or a projector housing 1 in which a light source device constituted by a light source and a condenser lens 2 is arranged. Although a cooling fan is also provided in the housing 1, these are already known to the public so that a detailed explanation thereto are omitted.

Figure 1C:
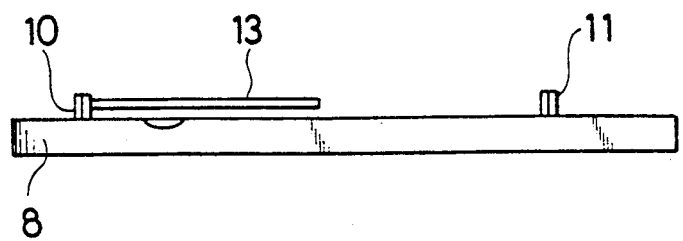
FIG. 1C is a side view of the support frame.
Figure 1D:
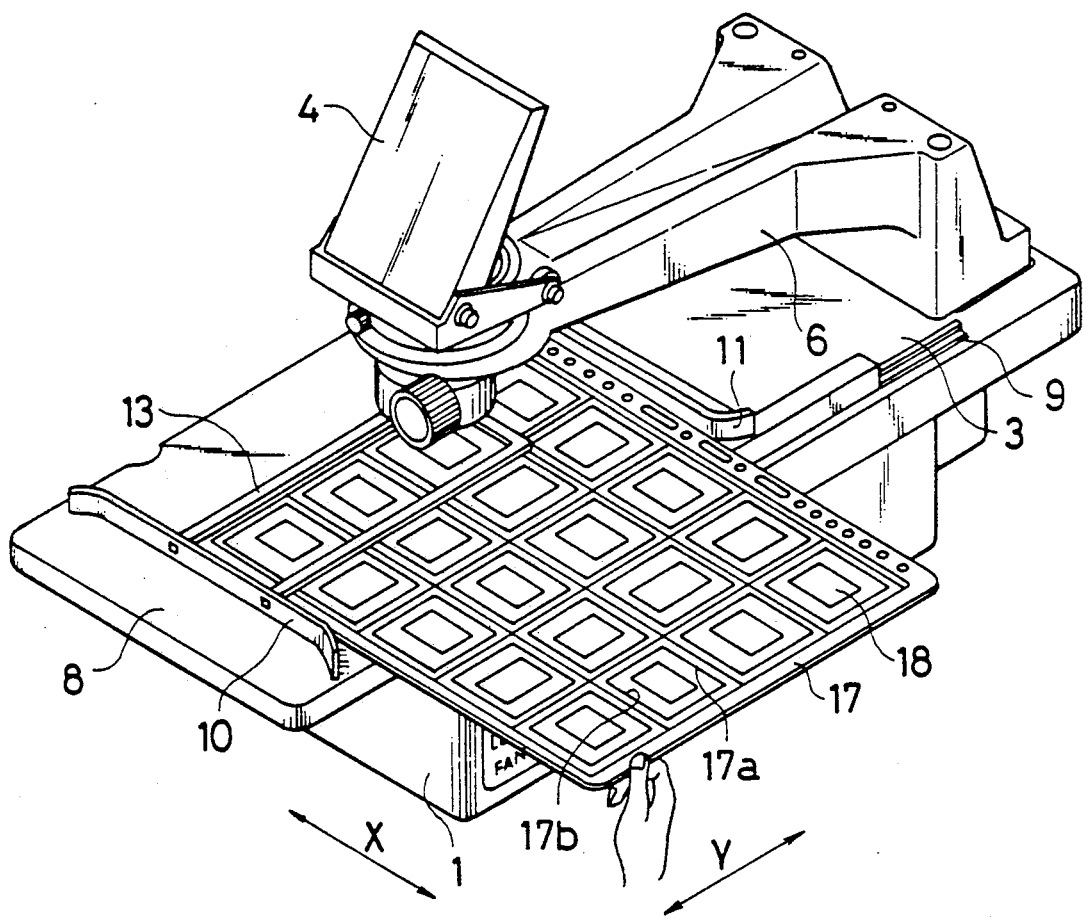
FIG. 1D is a perspective view showing appliance of a photographic slide for the projector of FIG. 1A.

The housing 1 is provided with an opening at a top surface thereof. The housing 1 is provided with a flange member 1a defining the opening of the housing 1. The flange member 1a carries at one end thereof a reflecting mirror 4 and an optical projecting mechanism having a projecting lens 5 through an arm 6. The opening of the housing 1 is covered by a translucent sheet 3. The projecting lens 5 is connected with an adjusting screw 7 for focusing. The flange member 1 is provided with a pair of guide rails at opposite sides thereof. A file sheet support frame 8 is mounted on the housing 1 for a reciprocating movement along the rails 9. The support frame 8 is formed with a rectangular opening 12 elongated in a longitudinal direction shown by an arrow Y in FIG. 1A, in which the rails 9 extend. The support frame 8 is also formed with a carrying surface 8a around the opening 12 for carrying a file sheet 17. The frame 8 is provided at opposite end portions with a pair of guide rails 10 and 11 extending in parallel with each other in a transverse direction shown by an arrow X in FIG. 1A. The file sheet 17 of a configuration as shown in FIG. 1D is provided with a grid like frame portion 17a defining a plurality of rectangular frames 17b arranged in both the directions of X and Y like a matrix. Each frame 17b carries a transparent material 18. The file sheet 17 is placed on the frame 8 to be carried by the carrying surface of the frame 8 in a manner that front and rear edges of the file sheet 17 is brought into a slidable engagement with the guide rails 10 and 11. A plate member 13 of a U-shaped configuration extending from the guide rail 10 along the opening 12 in the form of a cantilever. The plate member 13 is positioned to surround the condenser lens 2 of the light source device. As shown in FIG. 1C, the plate member 13 extends substantially in parallel with the carrying surface 8a of the frame 8. The file sheet 17 is inserted between the plate member 13 and the carrying surface 8a. The frame portion 17a of the file sheet 17 is of a convex configuration in section of which top surface is engaged with the plate member 13 so that the plate member 13 urges the frame portion 17a of the file sheet downward. Thus, the file sheet 17 is urged against the carrying surface 8a of the support frame 8 to be retained. In order to change the transparent material 18 in the file sheet 17 for projection, the file sheet 17 can be moved by hand in the direction of the arrow X along the guide rails 10 and 11 and/or the support frame 8 can be moved in the direction of the arrow Y along the guide rails 9. With this operation, an upper surface of the frame portion 17a of the file sheet 17 is slid along a lower surface of the plate member 13 so that the transparent material 18 on the file sheet 17 can be kept from a damage.

Figure 2:
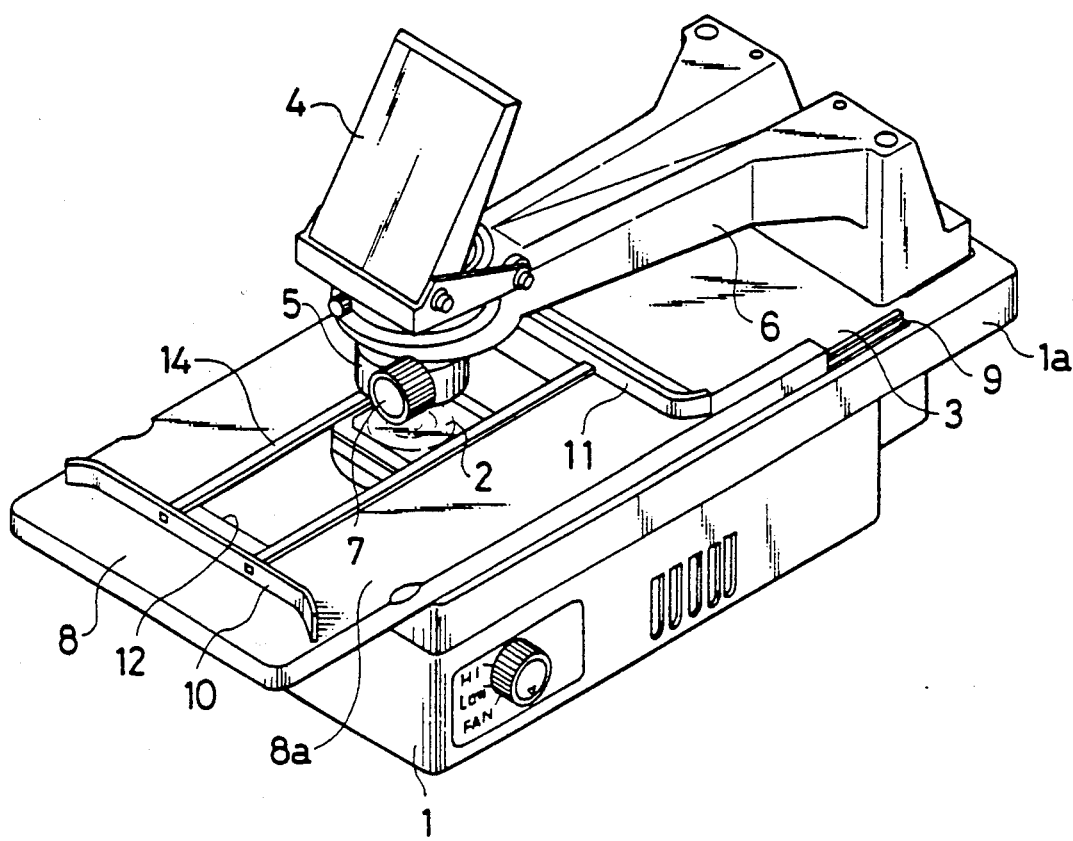
FIG. 2 is a perspective view similar to FIG. 1A but showing another embodiment of the present invention.

Referring to FIG. 2, there is shown second preferred embodiment of the present invention. This embodiment is substantially the same as the former embodiment except that a pair of retaining bars 14 are provided across the guide rails 10 and 11. The retaining bars 14 are arranged at opposite sides of the opening 12 so as to extend substantially in parallel with edge portions thereof. The retaining bars 14 urge the frame portion 17a of the file sheet 17 downward against the carrying surface 8a to retain the file sheet 17 between the bars 14 and the carrying surface of the frame 8 as well as the former embodiment.

Figure 3:
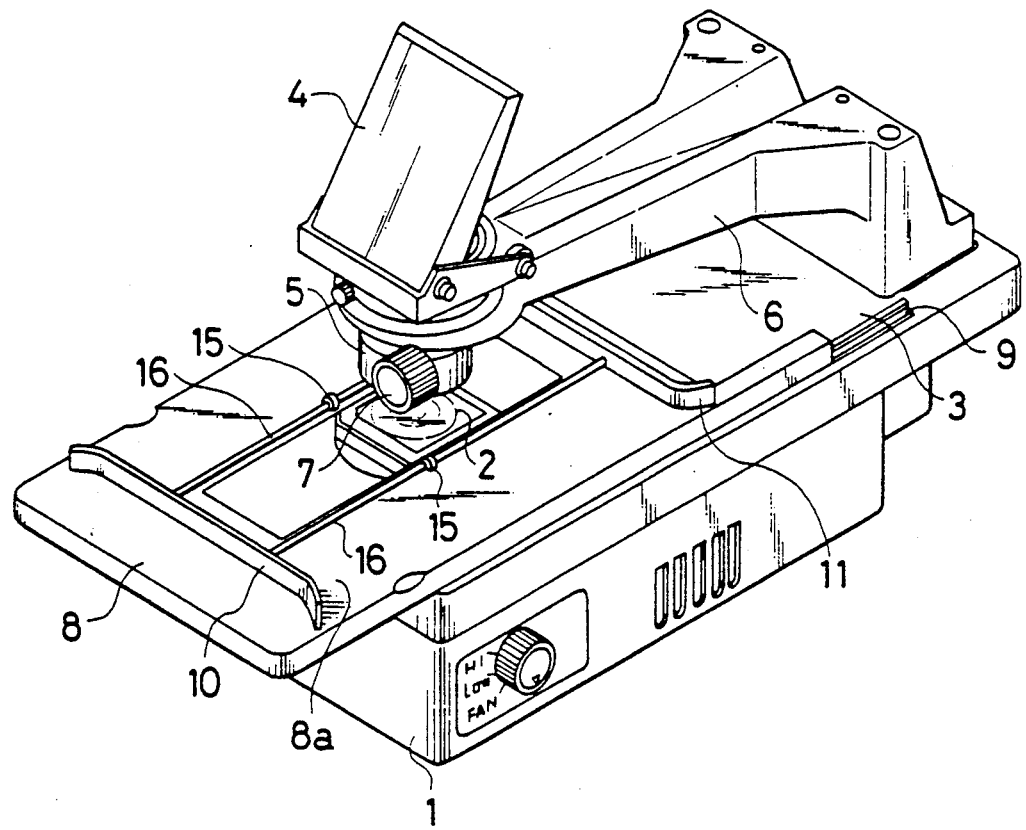
FIG. 3 is a perspective view in accordance with still another embodiment of the present invention.
Figure 4A:
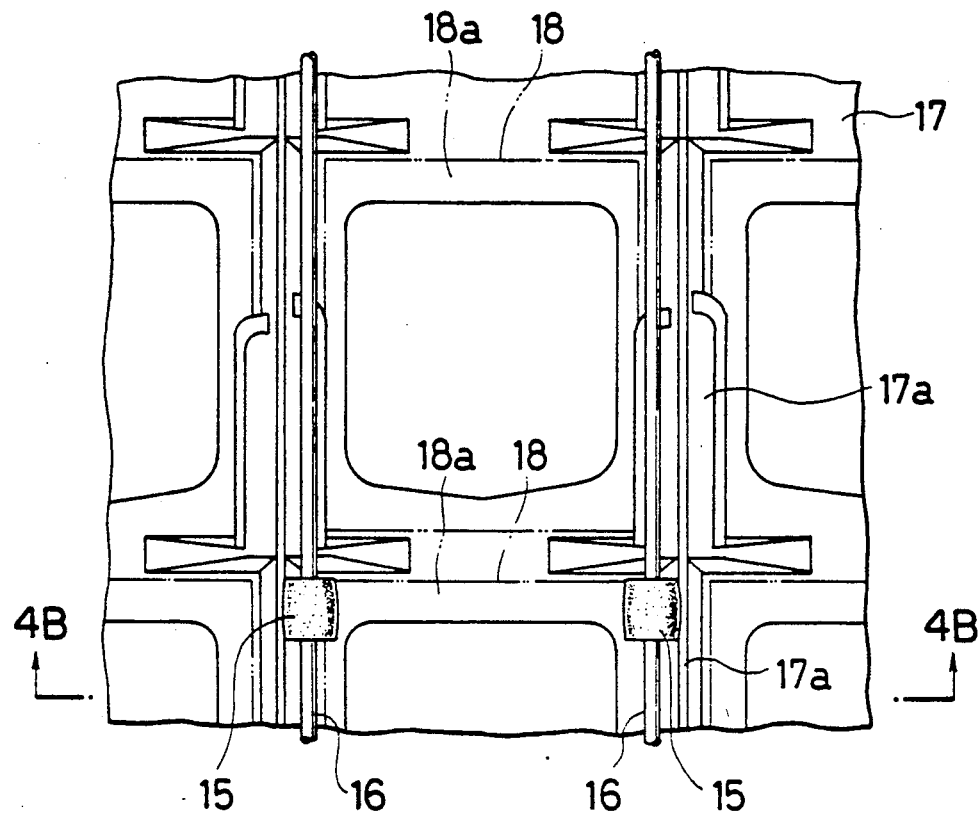
FIG. 4A is an enlarged plan view showing a relationship of a roller and a frame portion of a file sheet.
Figure 4B:
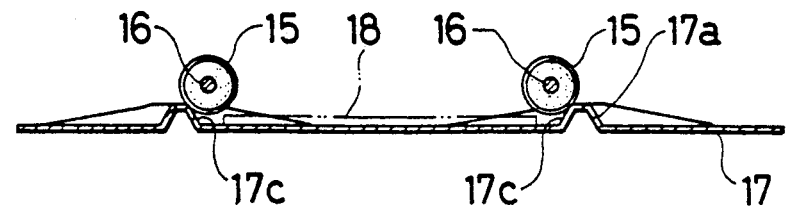
FIG. 4B is a sectional view taken along a line B—B.

Referring to FIG. 3, third preferred embodiment is shown. In this embodiment, a pair of resilient rods 16 are arranged at opposite sides of the opening 12 so as to extend substantially in parallel with edge portions thereof. a roller 15 is rotatably mounted on each of the rod 16 at an intermediate portion thereof in the vicinity of a projecting area or the condenser lens 2. FIGS. 4A and 4B show an engagement of the roller 15 and the file sheet 17. The frame portion 17a of the file sheet 17 is of a convex configuration in section forming slopes 17 on both sides as shown in FIG. 4B. The roller 15 is urged resiliently against the slope 17a by virtue of a resilient force of the resilient rod 16. Thus, the file sheet 17 is retained on the carrying surface of the frame 8. In the case where the file sheet 17 is moved in the transverse direction for changing the transparent material 18 for projection, the roller 15 climbs over the convex portion of the frame portion 17a of the file sheet 17 to be engaged with a next slope 17c for thereby retaining a next frame 17b. By repetition of this operation, an objective transparent material 18 can be set for projection. As shown in FIG. 4A, each of the roller 15 is located on a peripheral portion 18a of the transparent material 18 other than an image area thereof in which an image is provided for projection. Thus, as the file sheet is moved for changing the transparent material 18 thereon, the roller 15 is kept from an interference with the image area of the transparent material 18.

Figure 5C:
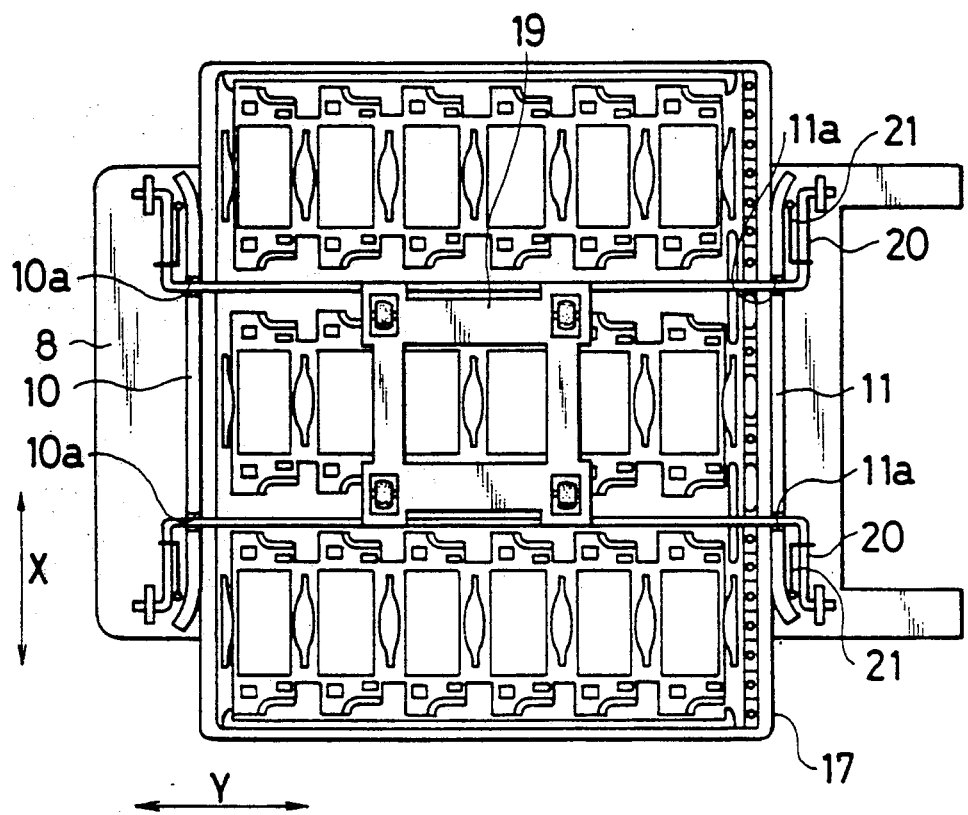
FIG. 5C is a plan view of a support frame of a projector employing the roller frame.
Figure 5D:
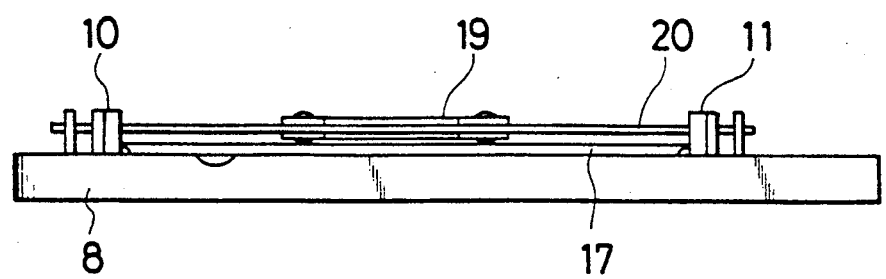
FIG. 5D is a side view of the support frame of FIG. 5C.

FIGS. 5A through 5B show forth embodiment of the present invention. According to this embodiment, a pair of crank shaped retaining rods 20 are mounted on the support frame 8. As shown in FIG. 5C, each rod 20 is rotatably mounted on the frame outside of the guide rails 10 and 11 with regard to the longitudinal direction. The guide rails 10 and 11 are formed with cutout portions 10a, 11a through which the rods 20 are urged against the file sheet 17 on the support frame 8. In order to urge the rod 20 against the file sheet 17, there is provided a spring 21 between each of the rod 20 and the support frame 8.

A roller frame 19 is provided across the pair of the rods 20. As shown in FIG. 5A, the roller frame 19 of a rectangular configuration is provided at four corners thereof with rollers 15 which are rotatable about shafts 15a extending in the longitudinal direction. The roller frame 19 is formed with V-shaped grooves 19a at opposite side ends as shown in FIG. 5B. The grooves 19a are brought into engagement with the rods 20 respectively so that the roller frame 19 is carried by the pair of rods 20. Thus, the roller 15 on the roller frame 19 is urged against the file sheet 17 on the support frame 8 by virtue of the rod 20 to thereby urge the file sheet 17 against the carrying surface 8a of the frame 8.

It is necessary to change a position of the roller 15 since a pitch of the frame portion 17a changes between a photographic slide and a prepared specimen for microscopic observation. According to the present invention, preferably, the roller frames 19 having various pitches of a frame portion 17a are prepared to be selectively mounted on the projector.

Figure 6A:
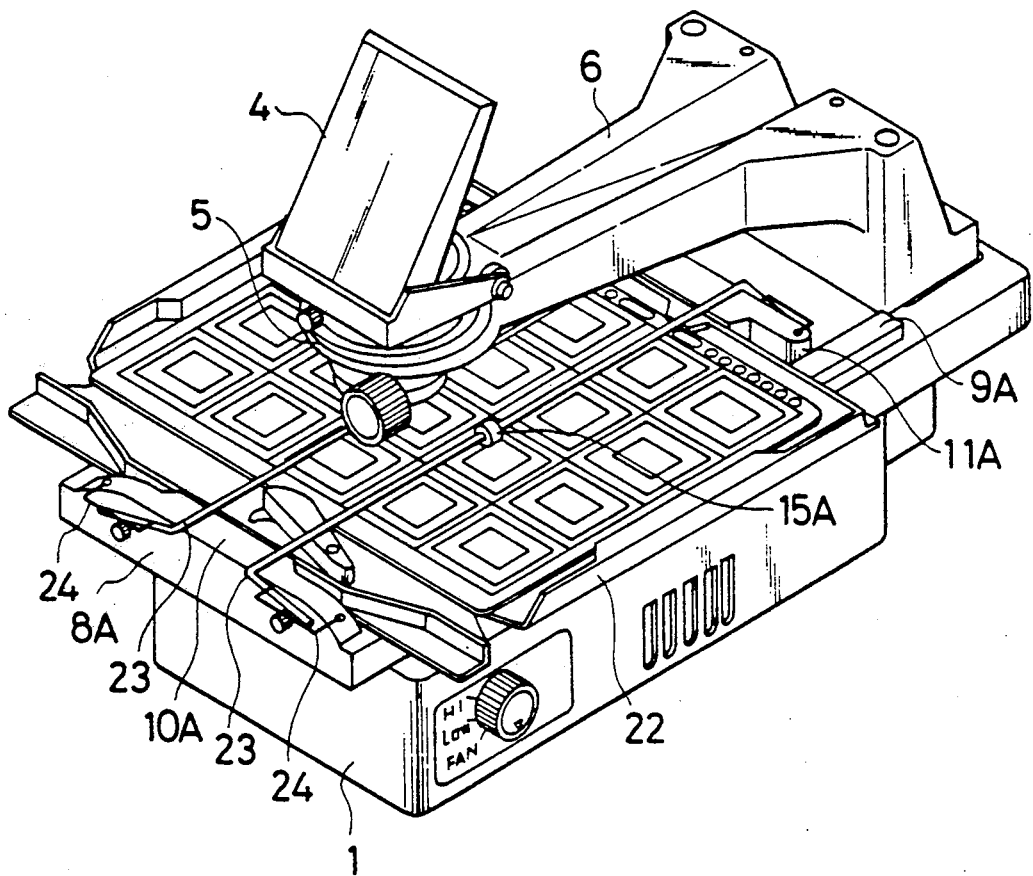
FIG. 6A is a perspective view showing a projector in accordance with yet further embodiment of the present invention.
Figure 6B:
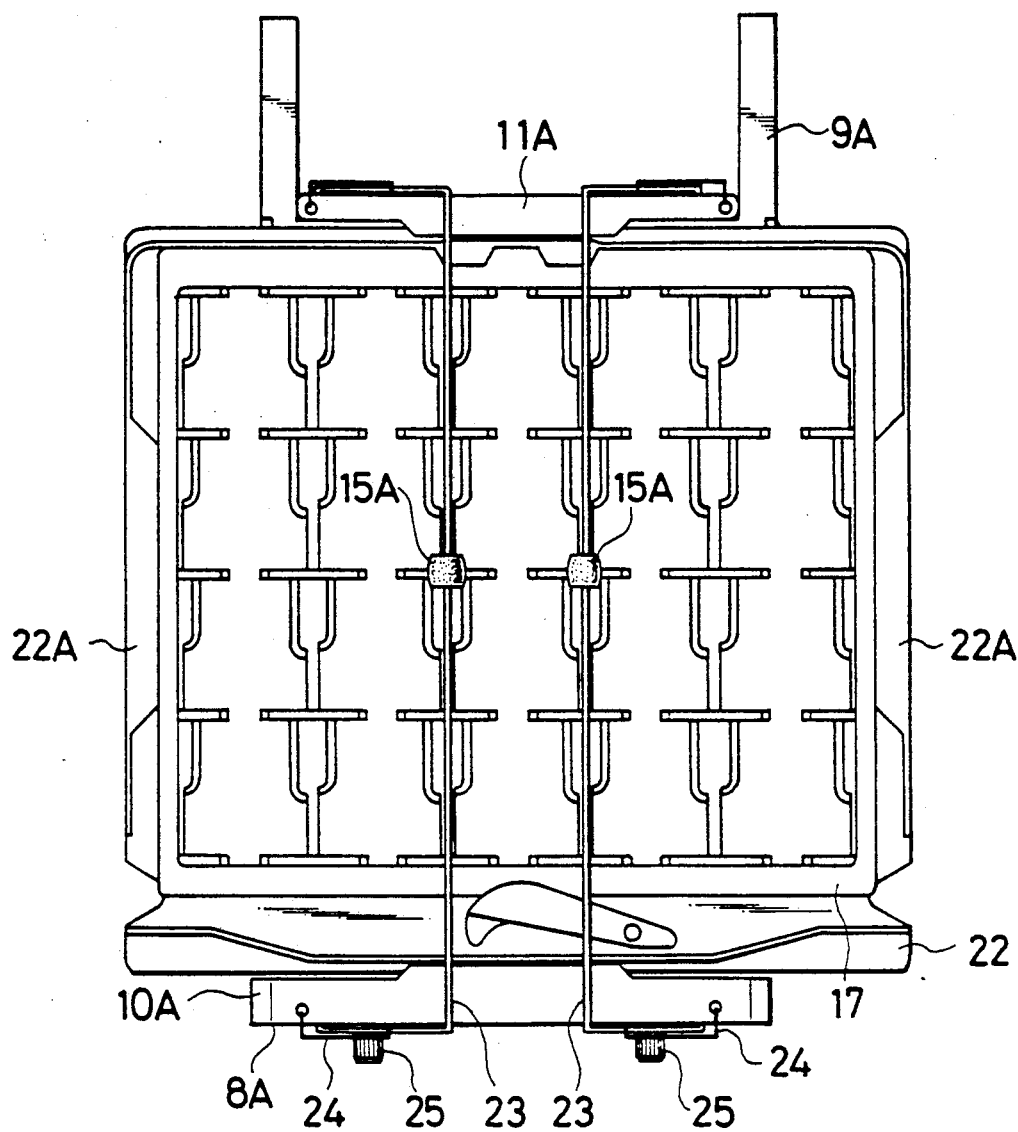
FIG. 6B is a plan view of a support frame and a stage.
Figure 6C:
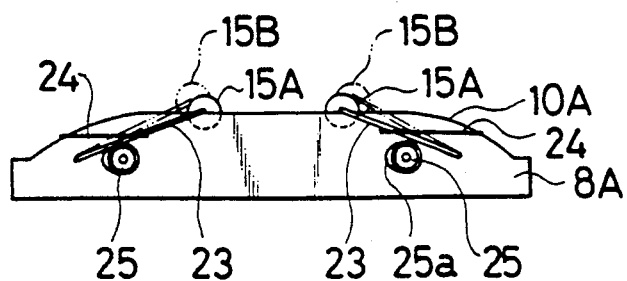
FIG. 6C is a front view of the stage and support frame.

Referring to FIG. 6A through 6C, there is shown a still another embodiment of the present invention. In this embodiment, the projector is a support frame 8A mounted on the housing 1 for a longitudinal, and a movable stage 22 mounted on the support frame 8A for a transverse direction. The support frame 8A is moved in the longitudinal direction along the rail 9A. The support frame 8a is provided at longitudinally opposite sides thereof with a pair of guide rails 10A, 11A extending transversely. The movable stage 22 can be moved transversely along the guide rails 10A, 11A.

The file sheet 17 is fixedly carried on the movable stage 22. In order to restrict a transverse movement of the file sheet 17, the movable stage 22 is formed with rim portions 22A at transversely opposite sides thereof.

The support frame 8A is provided with a pair of crankshaped rods 23 rotatably mounted on the support frame 8A outside of the guide rails 10A, 11A at opposite end portions thereof. Each of the rod 23 carries a roller 15A at an intermediate portion thereof. The rod 23 is extended over the guide rails 10A, 11A and the file sheet 17. As shown in FIG. 6C, there is provided a spring 24 between the support frame 8A and the rod 23 for urging the rod against the file sheet 17 on the stage 22. Therefore, the roller 15A on the rod 23 is urged against the file sheet 17 by virtue of the spring. In order to keep the roller 15A away from the file sheet 17 upwardly, a control rod 25 formed with a cam portion 25a is provided as shown in FIG. 6C. As the control rod 25 is rotated to bring the roller 15A to a position shown by a reference 15B in FIG. 6C, the stage 22 can be inserted under the roller 15A to be mounted on the frame 8A.

Referring to FIG. 7A through 7D, there is shown a modification of the embodiment explained in connection with FIGS. 3 and 4.

In this embodiment, the same numerals are employed for the same elements.

Figure 7A:
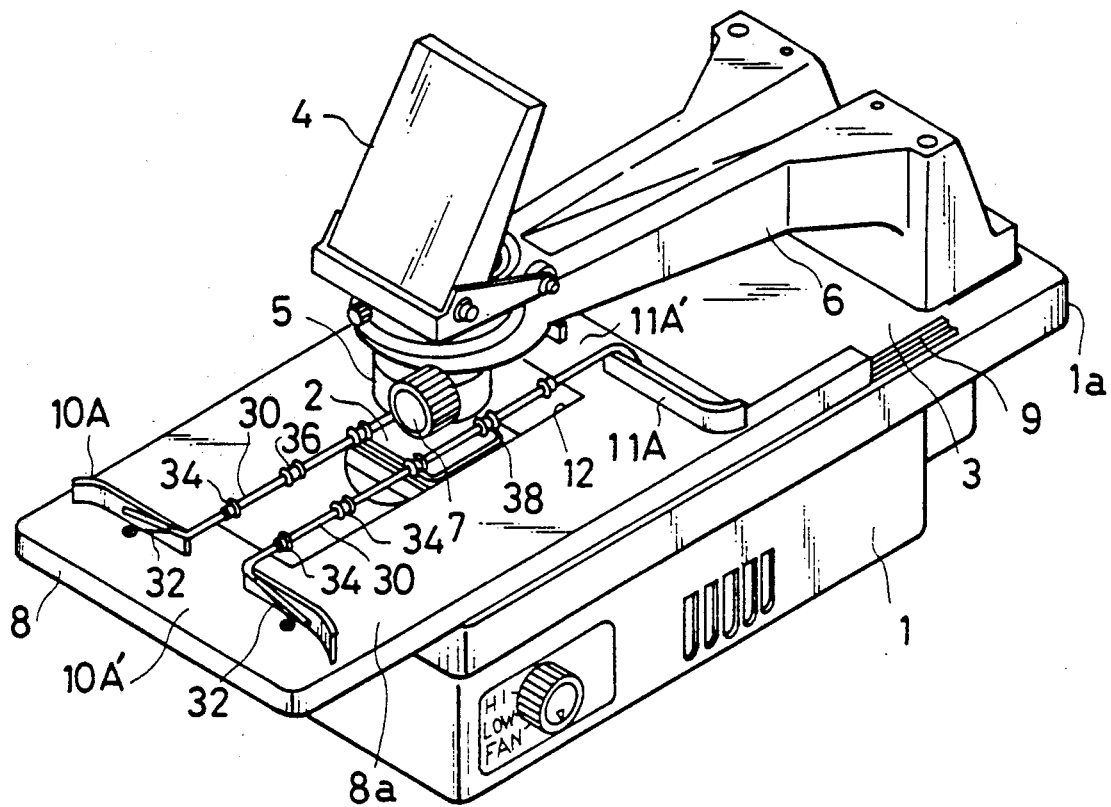
FIG. 7A is a perspective view of a projector in accordance with still further embodiment of the present invention.
Figure 7B:
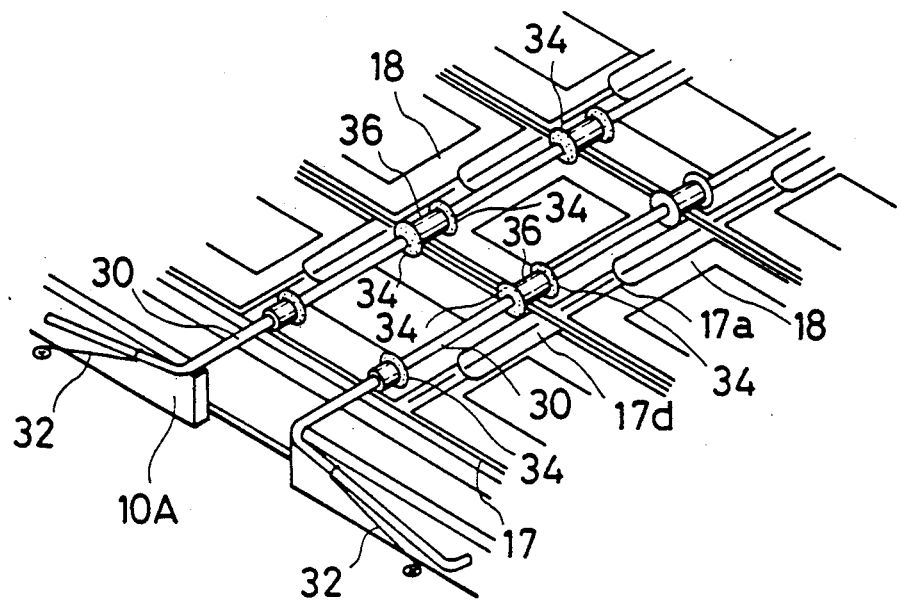
FIG. 7B is an enlarged and sectionally perspective view of the projector on which a file sheet is loaded.
Figure 7C:
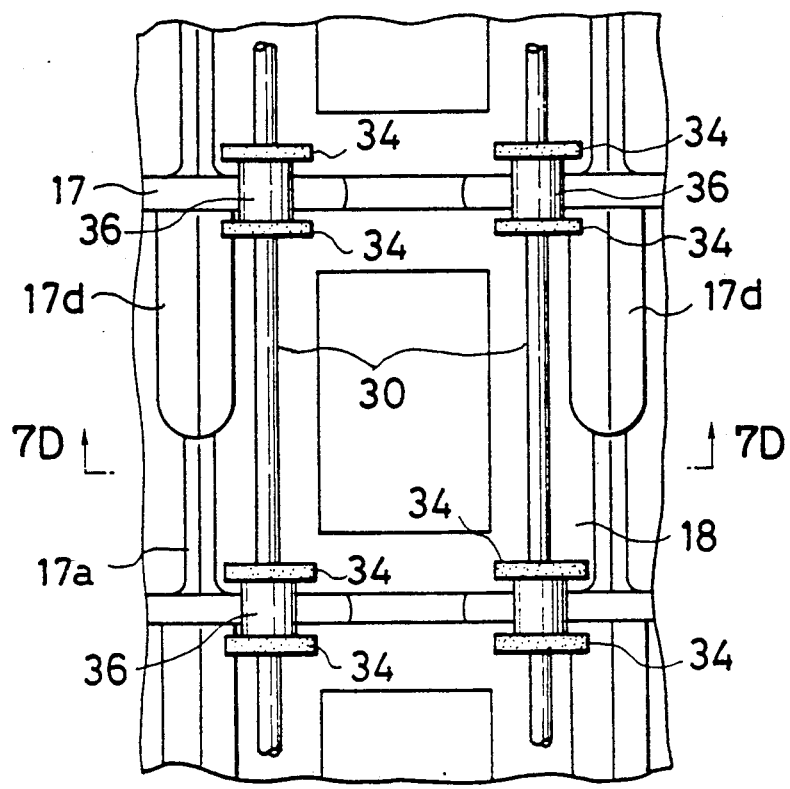
FIG. 7C is an enlarged and sectional plan view of FIG. 7B.

A pair of guide rails 10A, and 11A disposed away from each other in the longitudinal direction are separated at intermediate positions to define blank portions 10A' and 11A' respectively. There are provided a pair of crank-shaped rods 30 movable into the blank portions 10A' and 11A'. The rods 30 extend longitudinally. Each of the rod 30 is formed with cranked portions at opposite ends and pivotally mounted on outer side of the guide rails 10A and 11A Each of the rod 30 is urged toward the condenser lens 2 by virtue of a spring 32 as shown in FIG. 7A. A plurality of rollers 34 are rotatably mounted on the rod 30 in a spaced relationship with each other. As best shown in FIG. 7B, the rollers are positioned to be engaged with the transparent material 18 at a rim portion other than the image area. Two of the rollers 34 adjacent to each other engaged with rim portions of two transparent materials adjacent to each other respectively are connected by a reduced shaft portion 36. An outermost roller 34 engaged with a rim portion of outermost transparent material 18 is provided independently.

Figure 7D:
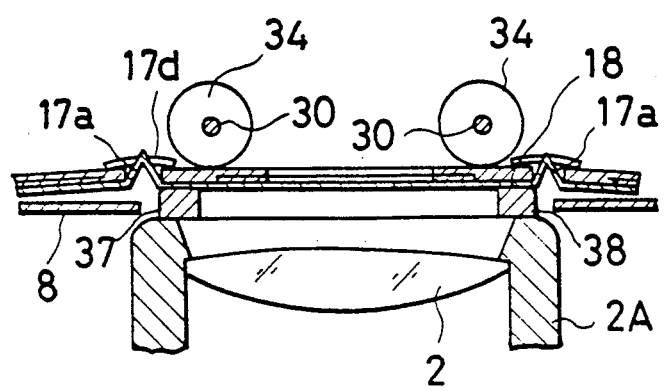
FIG. 7D is a sectional view taken along a line A—A.

As best shown in FIG. 7D, a support block 38 (of a rectangular configuration of the illustrated embodiment) having an opening 37 corresponding to a top opening 12 of a condenser lens frame 2A is mounted on a top portion of the frame 2A. A top surface of the support block 38 is located above the carrying surface 8a of the support frame 8 (preferably by approximately 1-2 mm).

With this structure, when the file sheet 17 is introduced between the rod 30 and the carrying surface 8a of the support frame 8, each of the transparent material 18 on a longitudinal row in the file sheet 17 retained by a positioning blade 17d is engaged with the rollers 34 at the four corners thereof. It will be understood from FIG. 7D that the transparent material 18 in align with the support block 38 on the condenser lens frame 2A is resiliently urged against the support block. As a result, the transparent material can be surely maintained at a horizontal attitude even when the file sheet 17 is moved longitudinally and transversely.

Referring to FIG. 8, the illustrated embodiment is provided with a projection lens mechanism comprising a projection lens 40 and a CCD 42 so that an image on the transparent material can be projected on a TV screen(not shown). In this embodiment, the transparent material 18 on the file sheet is retained by the similar structure to the embodiment explained in connection with FIGS. 7A through 7D.

While the invention has been specifically described in connection with preferred embodiments thereof, it will be understood by those skilled in the art that the foregoing and other changes or modifications in form and details can be made therein without departing from the spirit and scope of the invention.

I claim:

1. A projector comprising
a housing,
a horizontally extending support frame with a carrying surface for carrying a flexible file sheet in which a plurality of transparent materials are arranged in the form of a matrix longitudinally and transversely and with an opening on the carrying surface for projecting the transparent material,
light source means arranged in the housing at one side of the support frame,
projecting lens means arranged at the other side of the support frame,
the support frame being mounted on the housing for a reciprocating movement in a first direction,
the support frame being provided with guide means for movably carrying the file sheet in a second direction perpendicular to the first direction,
retaining means for retaining the file sheet onto the carrying surface, the retaining means being mounted on the support frame for allowing the file sheet to move relative to the retaining means with the retaining means maintaining contact with the file sheet in a horizontal plane,
a roller frame,
the retaining means including a pair of rods arranged on the support frame above the carrying surface in a spaced relationship with each other in the second direction and extending in the first direction,
the roller frame being provided with a plurality of rollers,
the roller frame being removably mounted on the rods.

2. A projector comprising
a housing,
a support frame movable relative to the housing in a first direction,
a movable stage movably mounted on the support frame in a second direction perpendicular to the first direction,
a horizontally extending carrying surface formed on the movable stage for carrying a flexible file sheet on which a plurality of transparent materials are arranged in the form of a matrix longitudinally and transversely, .
an opening formed on the carrying surface for projecting the transparent material,
light source means arranged in the housing at one side of the support frame and the movable stage,
projecting lens means arranged at the other side of the support frame and the movable stage,
retaining means provided on the support frame and extending above the movable stage for retaining the file sheet onto the carrying surface, the retaining means being mounted on the support frame for allowing the file sheet to move relative to the retaining means with the retaining means maintaining contact with the file sheet in a horizontal plane,
a roller frame,
the retaining means including a pair of rods arranged on the support frame above the carrying surface in a spaced relationship with each other in the second direction and extending in the first direction,
the roller frame being provided with a plurality of rollers,
the roller frame being removably mounted on the rods.

3. A projector comprising
a housing,
a horizontally extending support frame with a carrying surface for carrying a flexible file sheet in which a plurality of transparent materials are arranged in the form of a matrix longitudinally and transversely and with an opening on the carrying surface for projecting the transparent material, light source means arranged in the housing at one side of the support frame, projecting lens means arranged at the other side of the support frame, the support frame being mounted on the housing for a reciprocating movement in a first direction, the support frame being provided with guide means for movably carrying the file sheet in a second direction perpendicular to the first direction, retaining means for retaining the file sheet onto the carrying surface, the retaining means being mounted on the support frame for allowing the file sheet to move relative to the retaining means with the retaining means maintaining contact with the file sheet in a horizontal plane, a support block formed with an opening corresponding to the light source means and fixed to the light source means, the support block being formed with a horizontal top surface, the retaining means urging the transparent material against the horizontal top surface.

4. A projector in accordance with claim 3, wherein the retaining means is provided with a pair of rods arranged in a spaced relationship with each other in the second direction and extending above the carrying surface in the first direction, spring means for urging the rods toward the support block, a plurality of rollers rotatably mounted on each of the rods in a spaced relationship with respect to one another in a longitudinal direction of the rod, the rod being pivotally mounted on the support frame.

5. A projector in accordance with claim 4, wherein each of the rollers on the rod is engaged with an area other than an image area of the corresponding transparent material on which an image is prepared for projection.

6. A projector comprising a housing, a horizontally extending support frame with a carrying surface for carrying a flexible file sheet in which a plurality of transparent materials are arranged in the form of a matrix longitudinally and transversely and with an opening on the carrying surface for projecting the transparent material, light source means arranged in the housing at one side of the support frame, projecting lens means arranged at the other side of the support frame, the support frame being mounted on the housing for a reciprocating movement in a first direction, the support frame being provided with guide means for movably carrying the file sheet in a second direction perpendicular to the first direction, retaining means for retaining the file sheet onto the carrying surface, the retaining means being mounted on the support frame for allowing the file sheet to move relative to the retaining means with the retaining means maintaining contact with the file sheet in a horizontal plane, said guide means including a pair of guide rails arranged at opposite end portions of the support frame with regard to the first direction and extending in the second direction, the retaining means including a plate member extending from one of the guide rails toward the other of the guide rails in the first direction in the form of a cantilever.

7. A projector comprising a housing, a horizontally extending support frame with a carrying surface for carrying a flexible file sheet in which a plurality of transparent materials are arranged in the form of a matrix longitudinally and transversely and with an opening on the carrying surface for projecting the transparent material, light source means arranged in the housing at one side of the support frame, projecting lens means arranged at the other side of the support frame, the support frame being mounted on the housing for a reciprocating movement in a first direction, the support frame being provided with guide means for movably carrying the file sheet in a second direction perpendicular to the first direction, retaining means for retaining the file sheet onto the carrying surface, the retaining means being mounted on the support frame for allowing the file sheet to move relative to the retaining means with the retaining means maintaining contact with the file sheet in a horizontal plane, said guide means including a pair of guide rails arranged at opposite end portions of the support frame with regard to the first direction and extending in the second direction, the retaining means including a plate member extending across the guide rails in the first direction.

8. A projector comprising a housing, a horizontally extending support frame with a carrying surface for carrying a flexible file sheet in which a plurality of transparent materials are arranged in the form of a matrix longitudinally and transversely and with an opening on the carrying surface for projecting the transparent material, light source means arranged in the housing at one side of the support frame, projecting lens means arranged at the other side of the support frame, the support frame being mounted on the housing for a reciprocating movement in a first direction, the support frame being provided with guide means for movably carrying the file sheet in a second direction perpendicular to the first direction, retaining means for retaining the file sheet onto the carrying surface, the retaining means being mounted on the support frame for allowing the file sheet to move relative to the retaining means with the retaining means maintaining contact with the file sheet in a horizontal plane, said guide means including a pair of guide rails arranged at opposite end portions of the support frame with regard to the first direction and extending in the second direction, the retaining means including a pair of resilient rods in a spaced relationship with each other in the second direction and extending across the guide rails in the first direction, and roller means being rotatably mounted on each of the resilient rods.

9. A projector in accordance with claim 8, wherein each of the rods is provided with a pair of rollers in a spaced relationship with each other in the first direction.

10. A projector comprising
a housing,
a horizontally extending support frame with a carrying surface for carrying a flexible file sheet in which a plurality of transparent materials are arranged in the form of a matrix longitudinally and transversely and with an opening on the carrying surface for projecting the transparent material,
light source means arranged in the housing at one side of the support frame,
projecting lens means arranged at the other side of the support frame, the projecting lens means including an image sensor for detecting an image on the transparent material to project on a TV screen,
the support frame being mounted on the housing for a reciprocating movement in a first direction,
the support frame being provided with guide means for movably carrying the file sheet in a second direction perpendicular to the first direction,
retaining means for retaining the file sheet onto the carrying surface, the retaining means being mounted on the support frame for allowing the file sheet to move relative to the retaining means with the retaining means maintaining contact with the file sheet in a horizontal plane.

* * * * *